United States Patent [19]
Faddis

[11] Patent Number: 5,772,272
[45] Date of Patent: Jun. 30, 1998

[54] COMBINATION GOLF CART SUN VISOR AND STORAGE DEVICE

[76] Inventor: Thomas D. Faddis, Main Post Office 379 N. Oats St., Dothan, Ala. 36302

[21] Appl. No.: 566,090

[22] Filed: Dec. 1, 1995

[51] Int. Cl.⁶ .................................................. B60R 9/04
[52] U.S. Cl. ........................ 296/97.5; 224/312; 224/274; 280/DIG. 5
[58] Field of Search ............................... 296/96.19, 97.9, 296/97.5; 224/312, 37, 274; 160/DIG. 3; 280/DIG. 5, DIG. 6

[56] References Cited

U.S. PATENT DOCUMENTS

| | | | |
|---|---|---|---|
| 2,223,145 | 11/1940 | Wise | 160/DIG. 3 X |
| 2,517,337 | 8/1950 | Nodle | 224/312 X |
| 2,589,348 | 3/1952 | Diefenbach | 224/312 X |
| 3,016,262 | 1/1962 | Hunt | 296/97.5 |
| 4,650,238 | 3/1987 | Healey | 224/274 X |
| 5,387,010 | 2/1995 | Mohr | 224/274 X |

FOREIGN PATENT DOCUMENTS

| | | | |
|---|---|---|---|
| 570693 | 9/1958 | Belgium | 224/312 |
| 1327267 | 4/1962 | France | 296/97.5 |
| 474381 | 8/1969 | Switzerland | 296/97.5 |

*Primary Examiner*—Joseph D. Pape
*Attorney, Agent, or Firm*—Shlesinger, Arkwright & Garvey LLP

[57] ABSTRACT

Combination golf cart sun visor and storage device includes a visor body configured for being installed on a golf cart, and at least one storage element provided on the visor body. A fastening member is provided that is configured for fastening the visor body to a golf cart; whereby, in use, the fastening member attaches the visor body to the golf cart in the position of a sun visor, and at least one storage element retains objects to be stored.

14 Claims, 2 Drawing Sheets

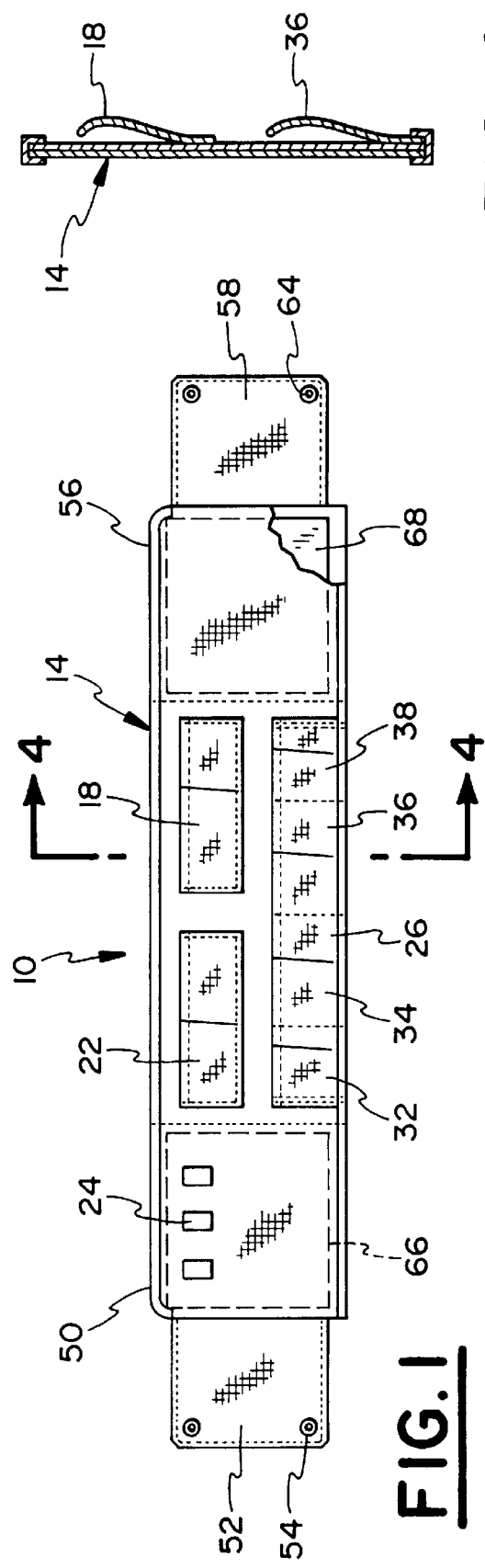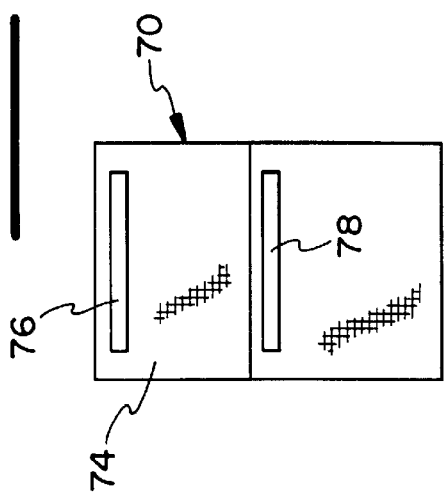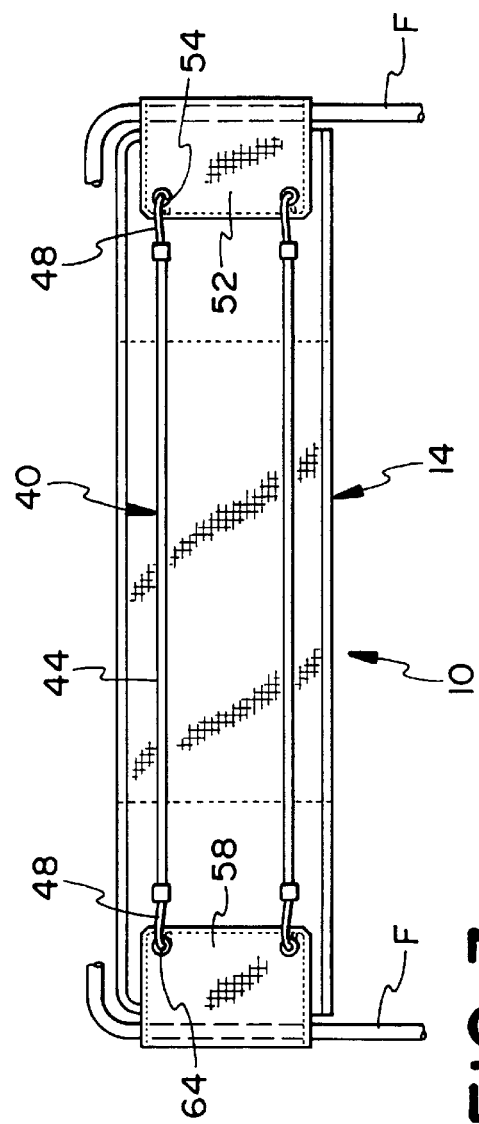

COMBINATION GOLF CART SUN VISOR AND STORAGE DEVICE

FIELD OF THE INVENTION

This invention relates to sun visors and storage devices. In particular, this invention relates to a combination golf cart sun visor having storage compartments.

BACKGROUND OF THE INVENTION

Various attempts have been made to overcome the problem of storing items securely over time, such as during the relatively lengthy outdoor game of golf.

There exist devices which modify or are combined with vehicle sun visors, and even sun visors for golf carts.

Prior art examples of such storage devices include U.S. Pat. No. 2,707,072 to Sims for "Article Holder for Sun Visors"; U.S. Pat. No. 4,521,051 to Cody et al. for "Visor with Mirror and Storage Means"; U.S. Pat. No. 4,650,238 to Healey for "Roof for Golf Cart"; U.S. Pat. No. 5,301,856 to Newsome for "Sun Visor Organizer"; and U.S. Pat. No. 5,344,020 to Ferguson for "Storage Device for Golf Carts".

While those above described prior art devices undoubtedly work, there is a need for even better sun visors and storage devices which have all the benefits of the known devices, yet none of the shortcomings.

Accordingly, it is an object of the prevention to provide a combination sun visor and storage device.

Another object of the invention is to provide a combination sun visor and storage device which overcomes the drawbacks of known devices.

Yet another object of the invention is to provide a combination sun visor and storage device which is practical and inexpensive.

A further object of the invention is to provide a combination sun visor and storage device which not only acts as a visor to block the sun during a round of golf, yet safely keeps one's wallets, watches, rings, checkbooks, sunglasses/sunglass cases, cigarettes, lighters, and the like in place.

Yet another object of the invention is to provide a combination sun visor and storage device which secures gloves against loss, as well as properly stores such gloves to lengthen their useful life.

A yet still further object of the invention is to provide a combination sun visor and storage device which is readily attached, removed, and stored in its own storage case.

Still another object of the invention is to provide a combination sun visor and storage device which can be attached to vehicles of various sizes, such as golf carts having different widths.

It is yet another object of the invention to provide a combination sun visor and storage device which provides secure storage easily accessible to the user.

Another object of the invention is to provide a combination sun visor and storage device which is weather resistant.

Still another object of the invention is to provide a combination sun visor and storage device which obviates the need for separate sun visors and storage compartments.

Still another object of the invention is to provide a combination sun visor and storage device which is easier to install and to use than known devices.

In summary, therefore, the invention is directed to combination visors and storage devices which embody the above features.

In summary, therefore, the invention is directed to a combination sun visor and storage device having a visor body configured for being installed on a golf cart, a storage element provided on the visor body, and a fastening member configured for fastening the visor body to a golf cart.

The invention will be further described with reference to the following drawings.

The use of general terms such as "sun visor", as well as relative terms such as "up" and "down," is for convenience only in describing the invention and should not be taken literally nor understood to be limiting.

BRIEF DESCRIPTION OF THE DRAWINGS

FIG. 1 is a front elevational view of a combination golf cart sun visor and storage device according to the invention;

FIG. 3 is a rear elevational view of the combination golf cart sun visor and storage device of FIG. 1, shown in use with the golf cart partially broken away;

FIG. 4 is a sectional view of FIG. 1, taken along line 4—4; and

FIG. 5 is a front elevational view of a storage case for receiving the combination golf cart sun visor and storage device when the device is in a folded up, non-use state.

DETAILED DESCRIPTION OF THE INVENTION

Figure 2:
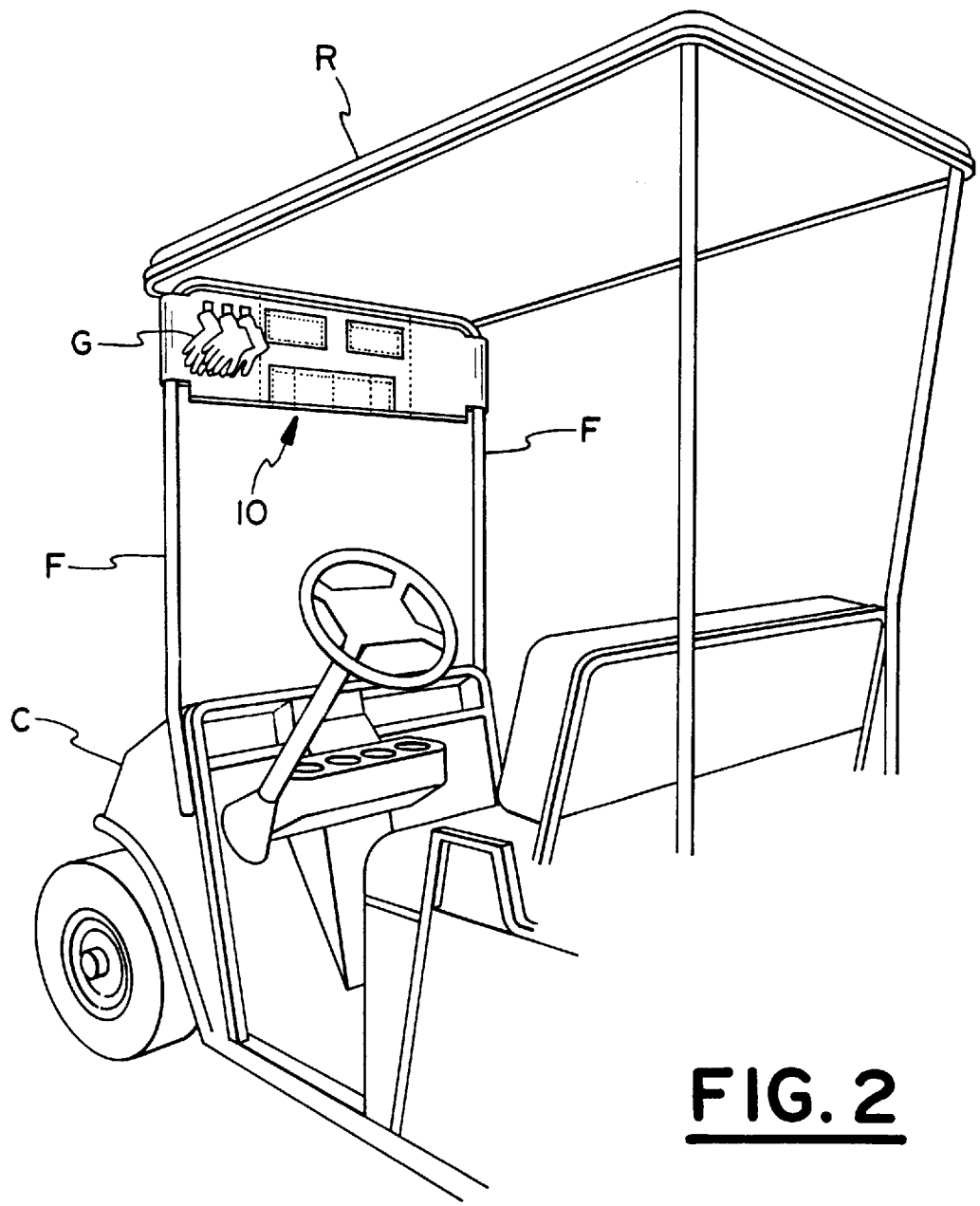
FIG. 2 is a front perspective view of the combination golf cart sun visor and storage device of FIG. 1, shown in use.

Turning to FIGS. 1–5, there is shown a combination golf cart sun visor and storage device 10, hereinafter sun visor/storage device 10, according to the invention.

Sun visor/storage device 10 includes a visor body 14 and a means for storing things attached thereto, such as storage compartments 18 and 22. When sun visor/storage device 10 is used with a golf cart C, good results have been achieved when a glove hanger 24 is provided on visor body 14. Good results have been achieved when glove hanger 24 includes an element for detachably attaching one or more golf gloves G. One or more pieces of the hook and/or loop of a hook and loop fastener were successfully provided as glove hanger 24 so that the respective mating one of a piece of hook and loop fastener on a typical golf glove G can be detachably attached thereto for suspending golf glove G.

Conveniently, a further storage compartment 26 may be provided, which storage compartment 26 itself is further subdivided into subcompartments 32, 34, 36, and 38.

A fastening member 40 is provided for attaching sun visor/storage device 10 to another object, such as golf cart C or other vehicle. Good results have been achieved when fastening member 40 is provided with an expansion element 44, such as a spring or piece of elastic material.

Likewise, a hook 48 provided on fastening member 40 has been successfully used to detachably attach fastening member 40 to visor body 14.

Specifically, a left extension 50 having a flap 52 extending therefrom has been successfully provided on visor body 14. One or more holes 54 may be provided in flap 52, sized so that hook 48 may be extended therethrough.

In a similar fashion, a right extension 56 having a flap 58 extending therefrom may be provided on visor body 14. One or more holes 64 may be provided in flap 58 so that hooks 48 may be inserted therethrough and retained thereby.

Good results have been achieved when visor body 14 is covered with a weather-proof material, and preferably a material which does not degrade under prolonged exposure to the sun, such as NAUGAHYDE® (e.g. a strong vinyl fabric used for upholstery, luggage, and the like). A stiffening element 66 has been successfully provided on left extension 50, and a stiffening element 66 has been provided on right extension 56, both of which were covered by weather resistant material.

The perimeters of holes 54 and 64 may be strengthened by sewing, or by the use of a metal or plastic insert, such as an "eye" or grommet. Expansion element 44 of fastening member 40 may be constructed as a weather-resistant, non-metallic piece of elastic functioning as a spring.

FIG. 4 shows visor body 14 which has been successfully built as a two-piece construction of joined front and back pieces of vinyl, the upper and lower edges of which have been reinforced. Compartments, such as the illustrated compartment 18 and 36 may have elastic material built in for enhancing the "springiness" thereof for engaging objects stowed therein. Likewise, the material of the compartments can be "bunched" together in the forming or sewing process to improve its holding ability.

FIG. 5 illustrates a storage case 70 defining a pocket therein which is sufficiently large to receive sun visor/storage device 10 in a collapsed, rolled up or folded up condition.

Storage case 70 includes a flap 74 configured for closing the opening defined by the pocket in storage case 70.

Conveniently, a closure device is provided for keeping flap 74 shut when not in use. For example, good results have been achieved when the closure device included a hook and loop fastener with a piece of hook material 76 provided on flap 74 and a mating piece of loop material 78 provided on storage case 70.

Operation

In use, combination sun visor and storage device 10 is typically attached to a vehicle, such as a golf cart C, to assist in blocking direct sunlight from striking the golfer's eyes, and to store the golfer's belongings.

The user simply holds visor body 14, inserts hook 48 of fastening member 40 through one of holes 64, for example, and locates sun visor/storage device 10 in the approximate desired position.

Typically, the user will orient visor body 14 so that storage compartment 18 and glove hanger 24, for example, face inwardly of the vehicle; namely, storage compartment 18 will face a seated passenger in golf cart C.

The user then wraps flap 58 around a suitable part of a frame F of cart C, such as a conventional tubular frame member. The other spaced opposed flap 52 is then wrapped around an opposed tubular upright of frame F in a manner so that flap 52 and flap 58 are located on the same side of visor body 14 facing each other. Thus, flaps 52 and 58 will typically be facing outwardly of the vehicle.

The hook 48 on the other end of fastening member 40 is now placed through one of the holes 54. Preferably, expansion element 44 is provided at such a length that expansion element 44 is under tension and exerts a force on both opposed flaps 52 and 58. The force should be selected so that sun visor/storage device 10 stays in the desired location on frame F, such as substantially directly below a roof R of golf cart C.

As will be readily appreciated, depending on the location of the sun in the sky relative to the sky line, the user may wish to move visor body 14 closer to or further away from roof R.

A second fastening member 40 may be connected in a similar manner, as best seen in FIG. 3.

The illustrated fastening members 40 are easily replaced when worn out. It will be appreciated that the separate fastening members 40 could be eliminated, and that one or both ends of each of the fastening members could be fixedly attached to visor body 14.

Storage compartments 18, 22, and 26 will typically be in the form of pockets having an open end, which open end will generally be oriented in use so that it is upwardly opening. The user simply places an object in the open end. Objects of varying shapes and sizes will be stowed securely, owing to the depth of the pockets defined by the height of storage compartments, 18, 22, and 32, as well as owing to the inherent flexibility and resiliency of the weather proof material from which storage compartments 18, 26, and 32 will typically be made.

When sun visor/storage device 10 is to be stored, any stowed items are removed from storage compartments 18, 26 and 32, and gloves may be removed from glove hangers 24. The free ends of respective hooks 48 are withdrawn from holes 54 and 64. Sun visor/storage device 10 is then folded up, such as by folding left flap 52 onto left extension 50, folding right flap 58 onto right extension 56, folding visor body 14 substantially down the middle so that storage compartment 18 is substantially aligned with storage compartment 22, and then folding one or both of left extension 50 and right extension 56 into substantial alignment with storage compartments 18 and 22, depending on the size of the pocket defined by storage case 70.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A combination golf cart sun visor and storage device, comprising:
   a) a visor body configured for being installed on a golf cart;
   b) at least one storage element provided on said visor body;
   c) a fastening member;
   d) said fastening member being configured for fastening said visor body to a pair of spaced opposed upwardly extending elongated frame members of a golf cart; and
   e) wherein said fastening member attaches said visor body to the pair of frame member of a golf cart in the position of a sun visor, and said at least one storage element retains objects to be stored.

2. A device as in claim 1, wherein:
   a) said fastening member is detachably attached to said visor body.

3. A device as in claim 2, wherein:
   a) said fastening member is detachably attachable to a golf cart.

4. A device as in claim 1, wherein:
a) said fastening member is detachably attachable to a golf cart.

5. A device as in claim 1, wherein:
a) said storage element includes at least one pocket.

6. A device as in claim 5, wherein:
a) said storage element includes at least one glove hanger having at least one of a hook and loop for mating with a respective loop and hook of a glove.

7. A device as in claim 1, wherein:
a) said visor body has a first, collapsed state for storage thereof, and a second, expanded state for use thereof.

8. A device as in claim 7, further including:
a) a storage case for receiving said visor body in its first, collapsed state.

9. A device as defined in claim 3, wherein:
a) said fastening member includes an expansion element expandable to various widths.

10. A device as defined in claim 1, wherein:
a) said fastening member includes an expansion element expandable to various widths.

11. A device as defined in claim 3, wherein:
a) said fastening member includes a hook.

12. A device as defined in claim 2, wherein:
a) said fastening member includes a hook.

13. A device as defined in claim 1, wherein:
a) said fastening member includes a hook.

14. A device as defined in claim 1, further in combination with a golf cart of the type including a body and a frame member supporting a roof extending upwardly from said body, wherein:
a) said fastening member fastens said visor body to said frame member.

* * * * *